Patented June 15, 1943

2,321,759

UNITED STATES PATENT OFFICE 2,321,759

MOLDING COMPOUNDS

Maurice L. Macht, Jersey City, and David A. Fletcher, Bloomfield, N. J., assignors to E. I. du Pont de Nemours & Company, Wilmington, Del., a corporation of Delaware No Drawing. Application March 30, 1940, Serial No. 326,964

12 Claims. (Cl. 260—84)

This invention relates to compounds adapted to be molded by compression or by injection and, more particularly, to improvements in such compounds in which methyl methacrylate is a major constituent.

The merits of polymerized methyl methacrylate as a molding compound are known to the art, as disclosed, for example, in United States Patent 1,980,483 of Rowland Hill. Also known to the art are various products made by the polymerization of methyl methacrylate in admixture with other polymerizable compounds.

Such resins are of thermoplastic character and articles molded therefrom are softened by exposure to heat, each at its respective more or less well-defined softening temperature. Such articles are susceptible to distortion or "unmolding" as a result of prolonged exposure to temperatures lower than their respective softening temperatures. Obviously, any increase in the respective softening temperatures of these resins or any decrease in their tendency to unmold would constitute a desirable improvement.

On the other hand, the economical commercial production of molded articles from such compounds is predicted upon ease and consequent rapidity of molding, and steps heretofore taken to improve such compounds in this respect, as by the addition of plasticizers, have undesirably lowered their softening temperatures and aggravated their tendency to unmold.

Other difficulties encountered in commercial production and commercial molding have included a yellowish discoloration visible in articles of thick section, a failure of the molded article to reproduce fully the smoothness and gloss of the surface of the mold in which it is made and, in the cases of certain copolymers, a noticeable haziness.

An object of the present invention is to modify polymethyl methacrylate in such a way as to increase its softening temperature, to decrease its tendency to unmold and, yet, at the same time to improve its molding characteristics, i. e., to make it more rapidly and hence more economically molded. A further object of the invention is to prepare molding compounds, of which methyl methacrylate is a major constituent, which will yield, under normal conditions of commercial molding, molded articles of smooth surface and high gloss. Further objects are improvements in color and clearness of articles molded from such molding compounds. Other objects will be apparent from the description of the invention given hereinafter.

The above objects are accomplished according to the present invention by polymerizing together 100 parts of methyl methacrylate and 5–25 parts of a polymerizable compound from the group consisting of styrene, vinyl acetate, and methyl acrylate, under conditions to give a copolymer having an average molecular weight in excess of about 15000 and malaxating this copolymer, the malaxating being such as to give a copolymer having an average molecular weight between about 15,000 and 32,000. The resulting material is then preferably comminuted to yield a molding compound of bulk density and granulation adapted to the technique of commercial molding. All parts given herein are by weight unless otherwise specified.

Since the process of the invention yields compounds which, although unplasticized, are readily moldable, it will be ordinarily unnecessary and indeed undesirable to include plasticizers therein, but such addition can be made if for any reason desirable. On the other hand, the presence of a mold lubricant is ordinarily definitely desirable.

Because the molding compounds herein considered are copolymers, the determination of their molecular weights with absolute accuracy would be unduly burdensome. For the purposes of the present invention, molecular weights may be determined with sufficient accuracy following the well known method of Staudinger ("Die hoch-molecularen organischen Verbindungen" (Springer, 1932), p. 56) in the following manner: The copolymer is dissolved in chloroform to form a one per cent solution; the viscosity of this solution is determined at 20° C. by any method yielding a result which can be calculated to absolute units and the molecular weight is calculated from the formula $$\frac{n_{sp}}{c} = K_m M$$

where $n_{sp}$ is the specific viscosity of the dissolved copolymer, $c$ is the concentration expressed in terms of the molecule which forms the unit of the chain structure, $K_m$ is a constant which has been determined for the given polymer, and $M$ is the molecular weight. In this calculation, the slightly erroneous assumption is made that the polymer is pure polymethyl methacrylate and the value of $K_m$ known for polyvinyl acetate is used regardless of the composition of the polymer. The respective correct values of the constant for the various copolymers coming within the scope of the invention would differ so slightly from this that the labor of determining them is not warranted. While the results of the calculation upon these two arbitrary assumptions will be slightly different from the true molecular weights, the procedure adopted is obviously simpler and yet equally serviceable for the present purpose.

The step of malaxating is conveniently conducted upon mixing rolls, of which the two members may be run at equal or at unequal speeds. It may, however, be conducted in other equipment, such as a masticator mixer or a screw stuffer. The rolling mill or other equipment is preferably heated in order to cause prompt softening and the formation of a dough. Usually one of the rolls of a rolling mill will be heated to a higher temperature than the other, as is the common practice.

As malaxation of the copolymer is an essential feature of the present invention and as it tends to reduce the average molecular weight of the copolymer malaxated, it is necessary, of course, to malaxate a copolymer whose average molecular weight exceeds 15,000 in order to obtain a finished copolymer of a molecular weight between the limits of 15,000 and 32,000.

It is to be noted that molecular weights calculated from viscosities represent merely the average size of molecules in mixtures of larger and smaller molecules. It is possible that the effect of malaxation is greater upon the larger molecules in such mixtures than upon the smaller, and that the resulting reduction in number of the largest molecules is the primary beneficial result of the treatment, and the reduction in average molecular size merely corollary thereto. Average molecular size is, however, at least a practical criterion of the quality of the malaxated resin.

Further, it is desirable that the conditions of the polymerization of the mixture of methyl methacrylate with styrene, with vinyl acetate, or methyl acrylate be controlled to yield a product having a molecular weight not too much in excess of the molecular weight desired in the final molding compound. By so doing, there is avoided the necessity of an expensive prolonged malaxation for the purpose of reducing the viscosity to the desired point. Methods of control of molecular weight during polymerization are already known. Conveniently, molecular weight is controlled by selection of an appropriate content of catalyst on the basis of the known fact that larger contents of catalyst yield products of lower molecular weight.

If the polymerization is carried out by a method which involves the maintenance of the monomer in the form of droplets in an aqueous vehicle and the gradual conversion of the liquid into corresponding globules of polymer, usually at reflux temperature, it has been found that polymer of molecular weights appropriate to the present invention are obtained when benzoyl peroxide is used as catalyst in an amount of about one to two per cent of the weight of the monomer.

Benzoyl peroxide is shown as catalyst in the examples herein, but the choice of this or any other catalyst is not a factor in the success of the invention.

The following examples are given to illustrate specific embodiments of the invention:

Example I

A mixture of

| | Parts |
|---|---|
| Methyl methacrylate | 100 |
| Styrene | 11.4 |
| Mold lubricant | 2.3 |
| Benzoyl peroxide | 2.3 | is polymerized to a polymer in the form of globules or granules, which is washed and dried in known manner. The viscosity of this polymer is determined as described above and corresponds to a molecular weight of 34,000.

This material is malaxated on a rolling mill, of which the rear roll has a temperature of about 250° F. and a speed of 20 R. P. M., and the front roll a temperature of about 340° F. and a speed of 15 R. P. M. After fifteen minutes of malaxation, the mass is removed from the rolls and, after being cooled, is comminuted to a granular form suitable for injection molding. The viscosity of the material after the malaxation is found to correspond to a molecular weight of 26,000.

Prior to the malaxation the material is slightly cloudy but afterwards it is entirely clear.

The comminuted molding compound is molded without difficulty in standard injection molding equipment at a reasonable temperature (e. g., a cylinder temperature of 200–230° C.).

The mold lubricant employed is known as "C-18 alcohol" and is a commercial mixture of alcohols of 16, 17, and, predominantly, 18 carbon atoms, derived from hydrogenated coconut oil esters.

Example II

The polymer described in the first paragraph of Example I is malaxated by being passed through a screw stuffer, e. g., of the type known as a tubing machine. The temperature of the barrel of the machine is maintained at about 160° C. and the temperature of the die at about 285 to 315° C. The material issuing from the die tends to swell to a porous mass as a result of expansion of trapped air and, perhaps, also of volatilization of traces of monomers. In this form it is very readily comminuted, after having been cooled, but the resulting granular molding compound is of lower bulk destiny than the comminuted product of Example I. This porosity can be reduced, and the bulk density increased, by passing the extruded mass, while still hot, between cool rolls, to compress it.

Example III

A mixture of

| | Parts |
|---|---|
| Methyl methacrylate | 100 |
| Styrene | 5 |
| Mold lubricant as in Ex. I | 2 |
| Benzoyl peroxide | 2.1 | is heated in suspension in water to yield a polymer of viscosity corresponding to a molecular weight of 36,000. This polymer is malaxated, in the manner described in Example I, until its viscosity corresponds to a molecular weight of 22,000.

Example IV

A mixture of

| | Parts |
|---|---|
| Methyl methacrylate | 100 |
| Styrene | 8.9 |
| Mold lubricant as in Ex. I | 2.2 |
| Benzoyl peroxide | 0.2 | is heated to yield a polymer having a molecular weight of approximately 100,000. This is malaxated in the manner described in Example I, and after fifteen minutes has a molecular weight of 52,500. By prolonged further malaxation its molecular weight is reduced to 31,000.

Example V

A mixture of

| | Parts |
|---|---|
| Methyl methacrylate | 100 |
| Styrene | 22.5 |
| Mold lubricant as in Ex. I | 2.6 |
| Benzoyl peroxide | 1.3 | is subjected to polymerizing conditions. The resulting polymer has a molecular weight of 36,000.

It is malaxated in a Banbury mixer until its molecular weight is 24,000.

Example VI

A mixture of

| | Parts |
|---|---|
| Methyl methacrylate | 100 |
| Styrene | 25 |
| Stearic acid | 1.3 |
| Benzoyl peroxide | 1.3 | is subjected to polymerizing conditions. The resulting polymer has a viscosity corresponding to a molecular weight of 40,000. By malaxation in a Banbury mixer, the molecular weight is reduced to 24,000. The stearic acid serves as a mold lubricant.

Example VII

A mixture of

| | Parts |
|---|---|
| Methyl methacrylate | 100 |
| Vinyl acetate | 18 |
| Mold lubricant as in Ex. I | 2.4 |
| Benzoyl peroxide | 2.4 | is suspended in an aqueous vehicle and the mixture is maintained at reflux temperature until polymerization is substantially complete. The polymer, after having been washed and dried, is found to have a molecular weight of 59,000. The granular material is malaxated on heated mixing rolls. After about twenty minutes, the mass is removed from the rolls, cooled, and comminuted to granular form suitable for commercial molding. The molding compound thus produced has a molecular weight of 25,000.

Example VIII

A mixture of

| | Parts |
|---|---|
| Methyl methacrylate | 100 |
| Vinyl acetate | 5.4 |
| Mold lubricant as in Ex. I | 2.1 |
| Benzoyl peroxide | 2.1 | is subjected to polymerizing conditions. The resulting polymer has a molecular weight of 43,000. This polymer is malaxated upon mixing rolls until its molecular weight has been reduced to 26,300.

Example IX

A mixture of

| | Parts |
|---|---|
| Methyl methacrylate | 100 |
| Vinyl acetate | 11 |
| Stearic acid | 1.1 |
| Benzoyl peroxide | 1.3 | is subjected to polymerizing conditions. The resulting polymer has a molecular weight of 43,000, which is reduced to 33,000 by malaxation in a Banbury mixer.

Example X

A mixture of

| | Parts |
|---|---|
| Methyl methacrylate | 100 |
| Vinyl acetate | 22.2 |
| Stearic acid | 1.2 |
| Benzoyl peroxide | 1.8 | is subjected to polymerizing conditions. The resulting polymer has a molecular weight of 40,000. Malaxation upon rolls in the manner of Example I reduces the molecular weight to about 25,000.

Example XI

A mixture of

| | Parts |
|---|---|
| Methyl methacrylate | 100 |
| Methyl acrylate | 5.3 |
| Stearic acid | 0.8 |
| Benzoyl peroxide | 0.85 | is subjected to polymerizing conditions. The resulting polymer has a molecular weight of 51,000. Malaxation in the manner of Example I reduces the molecular weight to about 28,000.

Example XII

A mixture of

| | Parts |
|---|---|
| Methyl methacrylate | 100 |
| Methyl acrylate | 11.2 |
| Stearic acid | 0.8 |
| Benzoyl peroxide | 0.85 | is subjected to polymerizing conditions. The resulting polymer has a molecular weight of 59,000. Malaxation in the manner of Example I, but with the two rolls running at equal speeds, reduces the molecular weight to about 27,000.

Example XIII

A mixture of

| | Parts |
|---|---|
| Methyl methacrylate | 100 |
| Methyl acrylate | 18 |
| Mold lubricant as in Ex. I | 2.4 |
| Benzoyl peroxide | 1.2 | is subjected to polymerizing conditions. The resulting polymer has a molecular weight of 45,000. Malaxation in the manner of Example II reduces the molecular weight to about 26,000.

Example XIV

A mixture of

| | Parts |
|---|---|
| Methyl methacrylate | 100 |
| Methyl acrylate | 25.2 |
| Stearic acid | 0.95 |
| Benzoyl peroxide | 1.0 | is subjected to polymerizing conditions. The resulting polymer has a molecular weight of 61,000. Malaxation in the manner of Example I reduces the molecular weight to about 29,000.

Example XV

A mixture of

| | Parts |
|---|---|
| Methyl methacrylate | 100 |
| Styrene | 12 |
| Vinyl acetate | 6 |
| Mold lubricant as in Ex. I | 2.4 |
| Benzoyl peroxide | 2.4 | is subjected to polymerizing conditions. The resulting polymer has a molecular weight of about 35,000. Malaxation in the manner of Example I reduces the molecular weight to about 24,000.

Example XVI

A mixture of

| | Parts |
|---|---|
| Methyl methacrylate | 100 |
| Vinyl acetate | 12.5 |
| Methyl acrylate | 12.5 |
| Mold lubricant as in Ex. I | 2.5 |
| Benzoyl peroxide | 2.5 | is subjected to polymerizing conditions. The resulting polymer has a molecular weight of about 41,000. Malaxation in the manner of Example I, but with the two rolls running at equal speeds, reduces the molecular weight to about 23,000.

It will be understood that the above examples are merely illustrative and that the present invention broadly comprises polymerizing together 100 parts of methyl methacrylate with 5–25 parts of styrene, vinyl acetate, or methyl acrylate, or any mixture of the three, together with mold lubricants, coloring matter, and other conventional components of molding compounds, if desired, to obtain a copolymer having an average molecular weight above 15,000 and malaxating the copolymer to obtain a finished product having an average molecular weight between about 15,000 and 32,000. If preferred, auxiliary components may be added to the copolymer during the malaxation rather than to the mixture of monomers prior to polymerization.

The malaxation of the copolymer is important and it has several different functions, some of which are less apparent than others. Clearly, the malaxation effects homogenization of the resin and, in some instances, this visibly improves the clarity of the resin. Also, the malaxation may effect volatilization of residual monomer and volatilization or decomposition of impurities. It has the definite effect of reducing the average molecular weight of the resin which effect it accomplishes most pronouncedly in the first few minutes of the treatment although, in cases where the resin has a high molecular weight at the start, it may be necessary to prolong the treatment to bring the molecular weight down to the desired point. However, even where reduction in the molecular weight is not required, the malaxation is nevertheless important in improving the properties of the resin.

As shown by the examples, the manner of malaxating and the duration of the treatment may vary widely. The malaxation must be sufficient to effect the desired reduction in the average molecular weight of the copolymer and to give a homogenizing effect. On the other hand, it must not be prolonged to give a copolymer having a molecular weight below the lower limit of the range herein disclosed.

It has been found that to obtain a satisfactory molding compound that 100 parts of methyl methacrylate should be polymerized in admixture with 5-25 parts of the other polymerizable component whether this component be entirely styrene, vinyl acetate, or methyl acrylate, or any mixture of the three such as illustrated in Examples XV and XVI. When styrene is used alone with methyl methacrylate, it is preferred to use about 9-15 parts per 100 parts of methyl methacrylate while about 11-22 parts of vinyl acetate per 100 parts of methyl methacrylate and about 9-20 parts of methyl acrylate per 100 parts of methyl methacrylate are preferred. Where a mixture of two or all three of the polymerizable components styrene, vinyl acetate, and methyl acrylate are to be used, each should be considered the full equivalent of the others in determining the proportion of the mixture to be used with the methyl methacrylate.

No attempt has been made to disclose various suitable coloring matter and other modifying agents that may be incorporated in the molding compound as they are familiar to those skilled in the art. It should be noted, however, that the molding compounds of the present invention may be modified. Since the molding compounds of the present invention are particularly advantageous in their improved clarity in relatively thick sections, this makes them especially well adapted for use in transparent moldings but the improvement in other qualities makes these resins highly advantageous when used with various pigments and dyes even though the article molded from the molding compounds so treated give opaque articles.

The invention provides a procedure for the manufacture of modified polymethyl methacrylate resins in the form of molding powders of qualities superior to those of polymethyl methacrylate itself. Molding compounds made in accordance with the invention are readily molded to yield molded articles which reproduce faithfully the form and finish of the mold, being free from flow marks and coming from a well-finished mold with smooth and glossy surface. The molded articles are, furthermore, distinctly more form-stable, i. e., less subject to unmolding, than analogous articles molded from polymethyl methacrylate plasticized to the point of equal facility in molding, and possess higher softening temperatures. They are also comparatively free from discoloration in thick sections.

As many apparently widely different embodiments of this invention may be made without departing from the spirit and scope thereof, it is to be understood that the invention is not limited to the specific embodiments thereof except as defined in the appended claims.

We claim:

1. Process of preparing a molding compound which comprises polymerizing together 100 parts of methyl methacrylate and 5-25 parts of a compound from the group consisting of styrene, vinyl acetate, and methyl acrylate, to obtain a copolymer having an average molecular weight in excess of 32,000 and malaxating said copolymer at an elevated temperature, the extent and character of said malaxation being such as to give a copolymer having an average molecular weight between about 15,000 and 32,000.

2. Process of preparing a molding compound which comprises polymerizing together 100 parts of methyl methacrylate and 9-15 parts of styrene to obtain a copolymer having an average molecular weight in excess of 32,000 and malaxating said copolymer at an elevated temperature, the extent and character of said malaxation being such as to give a copolymer having an average molecular weight between about 15,000 and 32,000.

3. Process of preparing a molding compound which comprises polymerizing together 100 parts of methyl methacrylate and 11-22 parts of vinyl acetate to obtain a copolymer having an average molecular weight in excess of 32,000 and malaxating said copolymer at an elevated temperature, the extent and character of said malaxation being such as to give a copolymer having an average molecular weight between about 15,000 and 32,000.

4. Process of preparing a molding compound which comprises polymerizing together 100 parts of methyl methacrylate and 9-20 parts of methyl acrylate to obtain a copolymer having an average molecular weight in excess of 32,000 and malaxating said copolymer at an elevated temperature, the extent and character of said malaxation being such as to give a copolymer having an average molecular weight between about 15,000 and 32,000.

5. A molding compound comprising a malaxated copolymer of 100 parts of methyl methacrylate and 5-25 parts of a compound from the group consisting of styrene, vinyl acetate, and methyl acrylate, said copolymer having an average molecular weight of between about 15,000 and 32,000.

6. A molding compound comprising a malaxated copolymer of 100 parts of methyl methacrylate and 9-15 parts of styrene, said copolymer having an average molecular weight of between about 15,000 and 32,000.

7. A molding compound comprising a malaxated copolymer of 100 parts of methyl methacrylate and 11-22 parts of vinyl acetate, said copolymer having an average molecular weight of between about 15,000 and 32,000.

8. A molding compound comprising a malaxated copolymer of 100 parts of methyl methacrylate and 9-20 parts of methyl acrylate, said copolymer having an average molecular weight of between about 15,000 and 32,000.

9. Process of preparing a molding compound which comprises polymerizing together 100 parts of methyl methacrylate and 5-25 parts of a compound from the group consisting of styrene, vinyl acetate, and methyl acrylate, to obtain a copolymer and malaxating said copolymer, the average molecular weight of said copolymer before said malaxation and the extent and character of said malaxation being such that the average molecular weight of said copolymer after said malaxation lies between about 15,000 and 32,000.

10. Process of preparing a molding compound which comprises polymerizing together 100 parts of methyl methacrylate and 9-15 parts of styrene to obtain a copolymer and malaxating said copolymer, the average molecular weight of said copolymer before said malaxation and the extent and character of said malaxation being such that the average molecular weight of said copolymer after said malaxation lies between about 15,000 and 32,000.

11. Process of preparing a molding compound which comprises polymerizing together 100 parts of methyl methacrylate and 11-22 parts of vinyl acetate to obtain a copolymer and malaxating said copolymer, the average molecular weight of said copolymer before said malaxation ånd the extent and character of said malaxation being such that the average molecular weight of said copolymer after said malaxation lies between about 15,000 and 32,000.

12. Process of preparing a molding compound which comprises polymerizing together 100 parts of methyl methacrylate and 9-20 parts of methyl acrylate to obtain a copolymer and malaxating said copolymer, the average molecular weight of said copolymer before said malaxation and the extent and character of said malaxation being such that the average molecular weight of said copolymer after said malaxation lies between about 15,000 and 32,000.

MAURICE L. MACHT.
DAVID A. FLETCHER.

CERTIFICATE OF CORRECTION.

Patent No. 2,321,759. June 15, 1943.

MAURICE L. MACHT, ET AL.

It is hereby certified that error appears in the printed specification of the above numbered patent requiring correction as follows: Page 1, first column, line 26, for "predicted" read --predicated--; and that the said Letters Patent should be read with this correction therein that the same may conform to the record of the case in the Patent Office.

Signed and sealed this 3rd day of August, A. D. 1943.

(Seal)

Henry Van Arsdale,
Acting Commissioner of Patents.